United States Patent [19]

Searfoss

[11] Patent Number: 5,031,955
[45] Date of Patent: Jul. 16, 1991

[54] TRUCK COVER

[75] Inventor: Timothy K. Searfoss, 2560 School Rd., Alger, Mich. 48610

[73] Assignees: Timothy K. Searfoss; Marlane C. Searfoss, both of Alger, Mich.

[21] Appl. No.: 494,563

[22] Filed: Mar. 16, 1990

[51] Int. Cl.$^5$ .............................................. B60P 7/04
[52] U.S. Cl. ...................................... 296/98; 296/100
[58] Field of Search .................................. 296/98, 100

[56] References Cited

U.S. PATENT DOCUMENTS

| | | | |
|---|---|---|---|
| 3,168,345 | 2/1965 | Roberts et al. | 296/100 |
| 3,498,666 | 3/1970 | Harrawood 296 | 98 X/ |
| 3,549,197 | 12/1970 | Sibley | 296/100 |
| 3,549,199 | 12/1970 | Sibley | 296/100 |
| 3,628,826 | 12/1971 | Sibley | 296/98 |
| 3,868,142 | 2/1975 | Bachand et al. | 296/98 |
| 4,050,780 | 6/1977 | Petretti | 296/100 |
| 4,082,347 | 4/1978 | Petretti | 296/98 |
| 4,126,351 | 11/1978 | Peteretti | 296/100 |
| 4,515,428 | 6/1970 | Killion | 296/100 |
| 4,740,029 | 4/1988 | Tuerk | 296/100 |
| 5,516,802 | 5/1985 | Compton | 296/98 |

Primary Examiner—Margaret A. Focarino
Assistant Examiner—Andrew C. Pike

[57] ABSTRACT

A truck cover is provided includes a flexible cover for selectively covering and uncovering the load bed of a truck. A winding assembly is mounted on the front end of the load bed and includes a reel for winding a flexible cover. A motor drives the reel through a worm drive. An extension assembly is provided which includes a pivoted rear bail connected to the rear and of the cover and a spring bias assembly which pivots the bail to the rear of the truck so as to extend the cover over the bed. A tension assembly is provided which utilizes a tension bail over the front of the cover having legs which are attached to the rear bail so the tension bail is lowered onto the front of the cover as the rear bail unwinds the cover from the winding assembly. Each leg of the rear bail is secured to the load bed through an offset pivot through which bias forces are transmitted when the cover is wound on the winding assembly to reduce strain on the winding assembly motor.

10 Claims, 3 Drawing Sheets

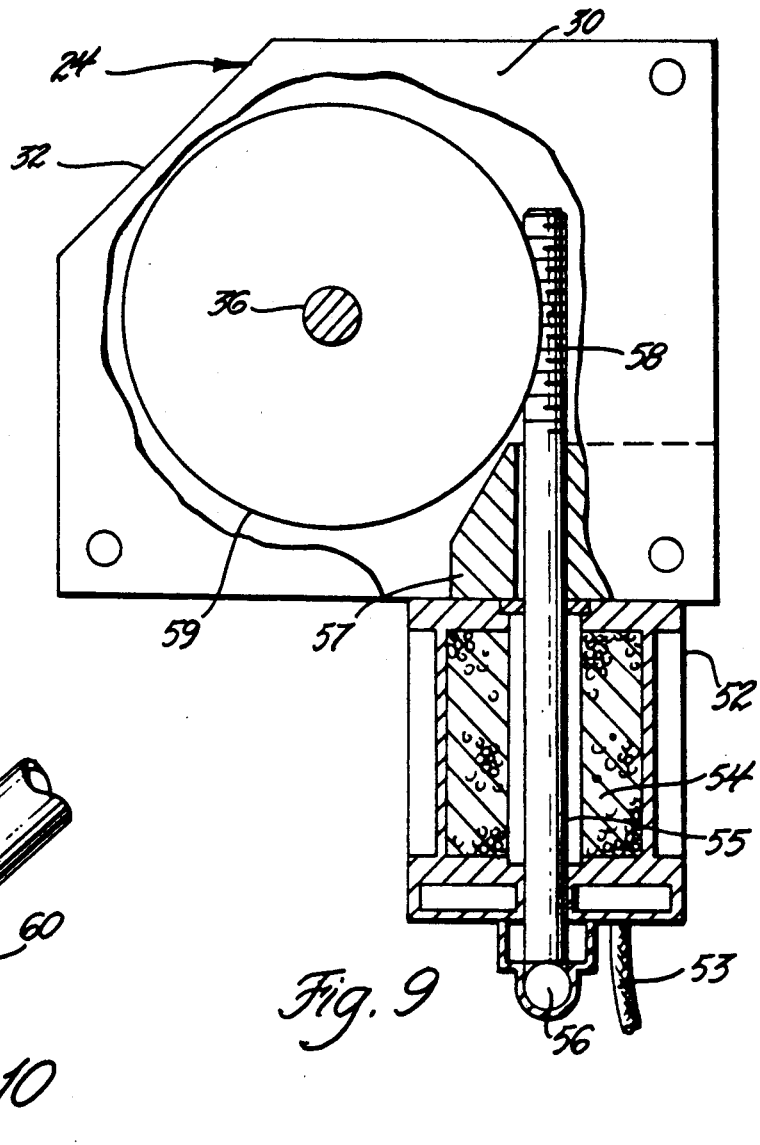
Fig. 9
Fig. 10
Fig. 12
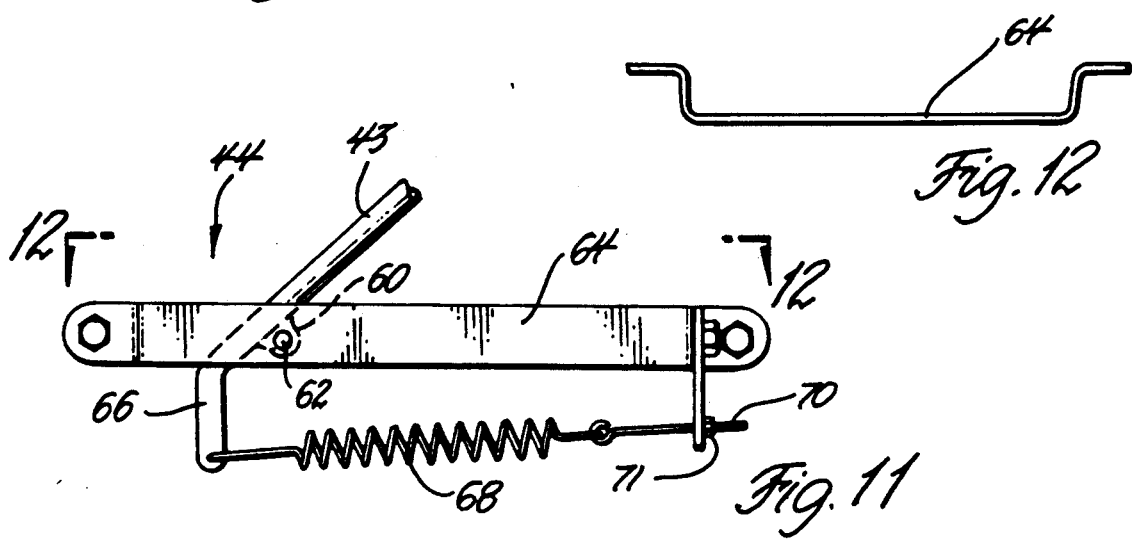
Fig. 11

TRUCK COVER

BACKGROUND OF THE INVENTION

Many trucks, particularly those hauling loose loads such as sand and gravel, need a truck cover to prevent wind blowing load particles off the load bed.

Various apparatus configurations have been devised for covering a truck load. Some such apparatus includes a motor for selectively winding a flexible cover.

An effective truck cover should be one which is easily operated by the truck driver so as to selectively cover and uncover the truck bed from the convenient location of the truck cab while tightly sealing both the front and rear of the truck bed to prevent wind passing under the truck cover and disturbing the truck bed contents.

Various truck cover apparatus has been known, including those systems described in the following U.S. Pat. Nos. 4,516,802; Comptom Peteretti 4,126,351; Petretti 4,082,347; Bachand et al. 3,868,142; Sibley 3,546,197; Sibley 3,549,199; and Sibley 3,628,826.

None of the Prior Art truck cover configurations provide a truck cover which may be conveniently motor operated from the cab of a truck while simultaneously extending the cover over the truck bed and pressing down on the front of the cover proximate a winding assembly which winds up the cover at the front of the truck bed.

SUMMARY OF THE INVENTION

A truck cover is provided which provides a means of simultaneously securing both the front and rear ends of a flexible cover over a truck load bed.

A winding assembly, which includes a motor operated reel on which the cover can be wound, is secured to the front of the truck bed.

A pivoting rear bail is secured to the sides of the truck bed and the exposed end of a flexible cover.

A spring bias assembly secures the rear bail to each side of the truck bed so as to bias the rear bail toward the rear of the truck. The spring bias assembly includes a tension spring and an operating arm secured to the truck with an offset pivot through which a portion of the spring bias force is transmitted when the cover is wound on the reel so as to reduce tensile force in the cover when the truck bed is uncovered.

A tension bail assembly is provided which includes a tension bail having two ends secured to the rear bail above the rear bail pivot point. The tension bail is above the cover and straddles the cover so as to press downward on the front end of the cover proximate the winding assembly when the cover is extended over the load bed. The extension assembly raises the tension bail assembly when the winding assembly retracts the cover by partially lifting the tension bail off the cover.

It is primary object of this invention to provide a truck cover which selectively covers and uncovers a truck load bed with a flexible cover that can be wound on a reel at the front of the truck bed and which can be extended rearward over the truck bed while simultaneously pressing downward on the front of the cover proximate the winding assembly.

It is another object of this invention to provide a truck cover which is stored on a winding assembly at the front of a truck bed and which has an edge biased toward the rear of the truck bed by an extension assembly that includes a rear bail secured to the truck bed by means of an offset pivot through which bias forces are transmitted when the cover is wound on the winding assembly so as to reduce the bias force on the winding assembly motor when the cover is wound on the winding assembly.

It is another object of this invention to provide a truck cover which utilizes a winding assembly onto which the truck cover can be wound at the front of the truck load bed and which utilizes a worm drive connecting a drive motor to the winding assembly reel for positive control of the truck cover extension over the truck bed.

DESCRIPTION OF THE DRAWINGS

FIG. 9 is an end view with parts removed of the winding assembly shown in FIG. 3.

FIG. 10 is a side view with parts removed of the rear bail used in the extension assembly in FIG. 1.

FIG. 11 is a perspective view of the FIG. 1 tension assembly with cover removed.

FIG. 12 is a perspective view of strap 64 in FIG. 11 taken along lines 12—12.

DESCRIPTION OF THE PREFERRED EMBODIMENT

Figure 1:
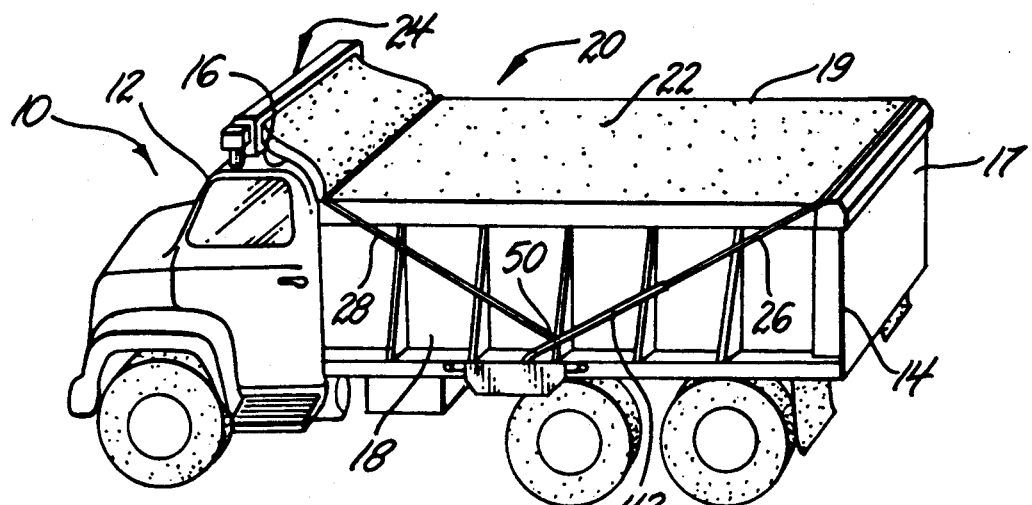
FIG. 1 is a side perspective view of a truck on which a truck cover is installed embodying the principals of the subject invention.

As shown in FIG. 1, a truck 10 of a conventional design is illustrated having a cab 12 and a load bed 14. The load bed 14 includes front and rear ends 16 and 17 and the first and second sides 18 and 19.

The subject invention may be utilized on both flat truck beds and those having raised sides as illustrated in FIG. 1.

A truck cover assembly 20 embodying the principals of the subject invention is illustrated in FIG. 1 on truck 10 for covering the load bed 14.

The truck cover assembly 20 includes a flexible cover 22, a winding assembly 24 for winding and storing cover 22, an extension assembly 26 for extending cover 22 over load bed 14. and a tension assembly 28 for applying a downward force on cover 22 proximate front end 16 of load bed 14.

Figure 2:
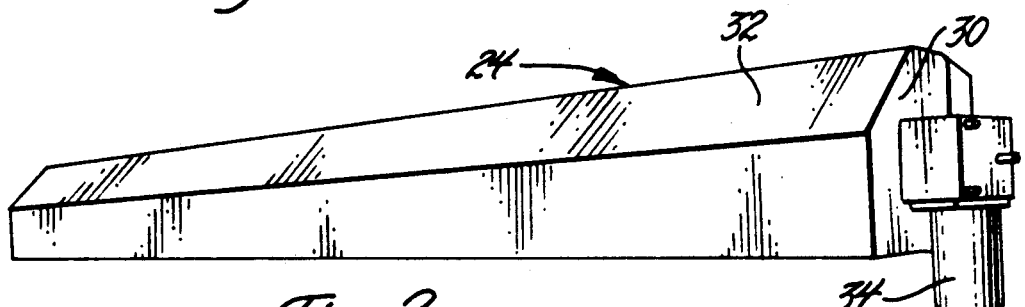
FIG. 2 is a perspective view of a truck cover winding assembly utilized in FIG. 1.

As shown in FIG. 2, the winding assembly 24 includes an exterior winding assembly housing 30 having a tapered front surface 32 for streamlining the housing 30 and causing wind to flow upward over assembly 24.

The winding assembly 24 also includes the motor assembly 34 illustrated in greater detail in FIG. 9.

Figure 3:
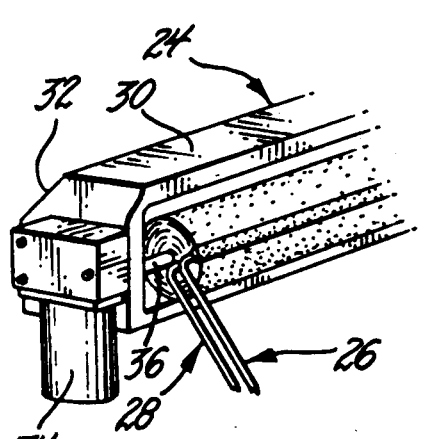
FIG. 3 is a partial view of the winding assembly in FIG. 2.
Figure 4:
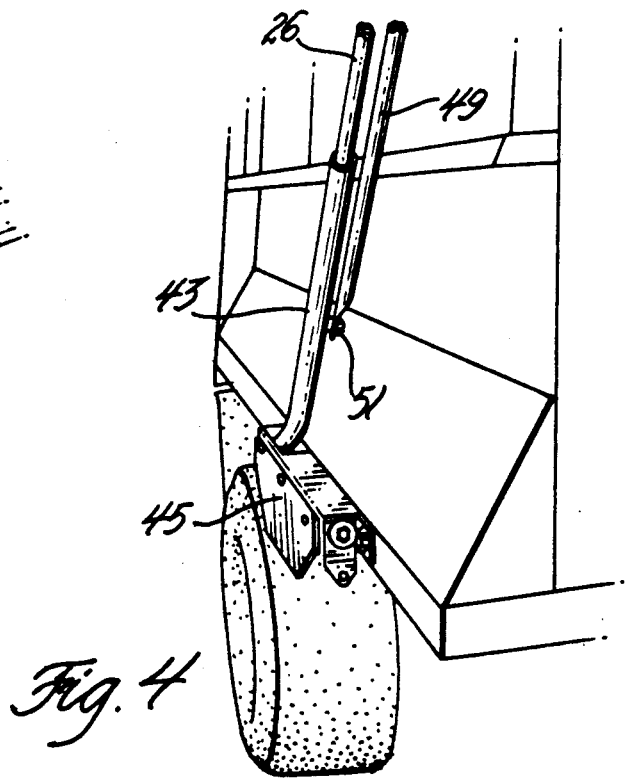
FIG. 4 is a perspective view of the extension and tension assemblies on the right side of the truck bed shown in FIG. 1 as viewed toward the rear.
Figure 5:
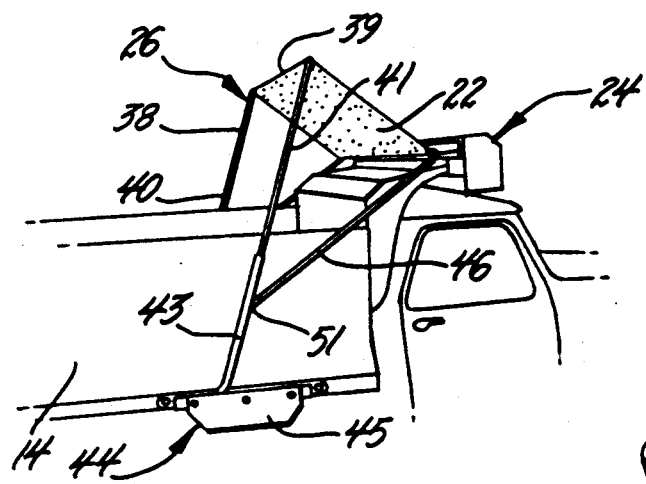
FIG. 5 is the right side view of the truck cover apparatus in FIG. 1 showing approximately a 25% truck cover extension.
Figure 6:
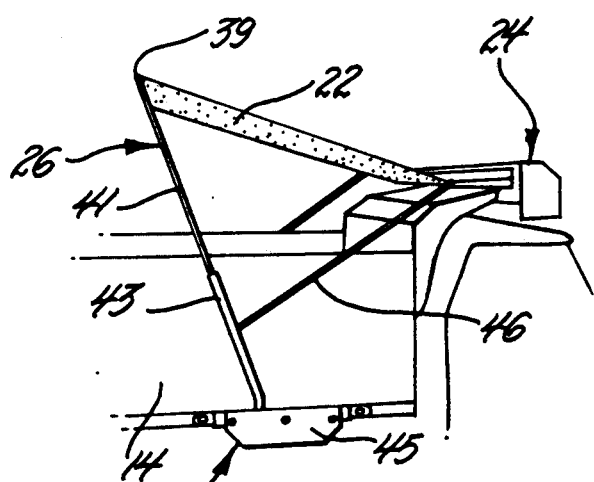
FIG. 6 is the right side view of the truck cover apparatus in FIG. 1 showing approximately a 50% truck cover extension.
Figure 7:
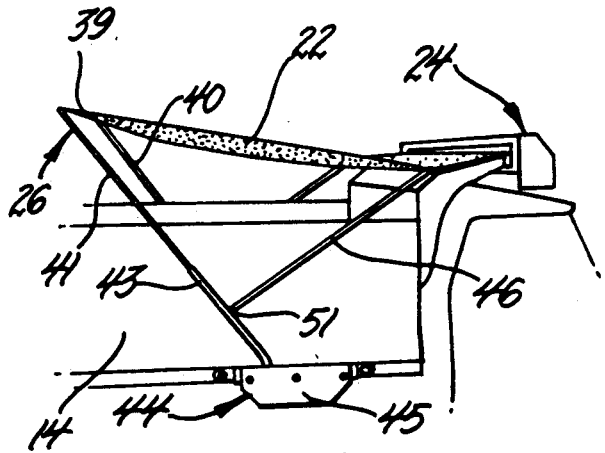
FIG. 7 is the right side view of the truck cover apparatus in FIG. 1 showing approximately a 75% truck cover extension.

As shown in FIG. 3, winding assembly 24 includes a reel 36 having an axis which is transverse to the longitudinal axis of truck 10. Reel 36 is provided for winding and storing the cover 22.

As shown in FIG. 3 through FIG. 8, the extension assembly 26 includes an extension bail 38 which includes a cover support section 39 having a transverse axis which extends in a transverse direction above load bed 14. Extension bail 38 also includes two legs 40 and 41 which each connects to the cover support section 39 and extend downwardly to the sides 18 and 19 of load bed 14.

Persons versed in the art will appreciate that extension bail 38 may either be made of a single "U"-shaped rod or tube or it may be formed of three or more sections. If truck cover assembly 20 is manufactured suitable for installation on truck bed 14 of various sizes, extension bail 38 may be made of telescoping tubular material as illustrated in FIG. 5 through FIG. 8 in which extension bail 38 includes a "U"-shaped tube that includes cover support section 39 and the upper sections of legs 40 and 41 while the lower sections 42 and 43 of legs 40 and 41 are of larger diameter into which the "U"-shaped section of extension bail 38 is inserted and pinned in a suitable conventional manner.

Extension assembly 26 also includes an attachment assembly 44 for attaching legs 40 and 41 to load bed 14 both by a pivotal attachment and in such a manner that the legs 40 and 41 are biased toward the rear end 17 of load bed 14. Attachment assembly 44 includes a cover 45 shown in FIG. 5 through FIG. 8. Attachment assembly 44 is illustrated in detail in FIG. 10 and FIG. 11.

Figure 8:
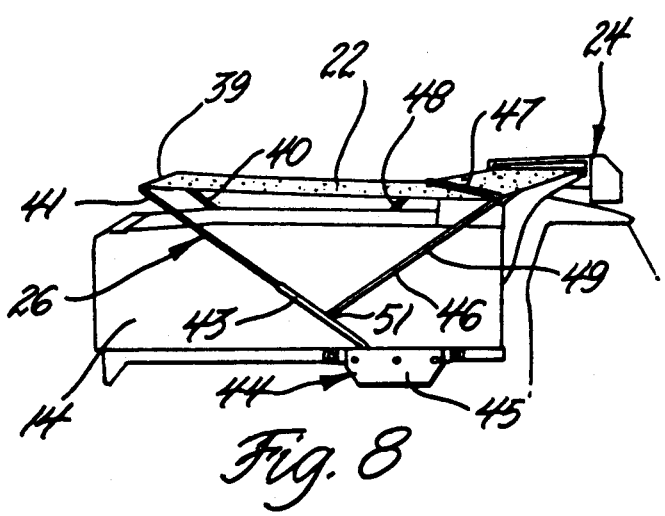
FIG. 8 is the right side view of the truck cover apparatus in FIG. 1 showing approximately a 90% truck cover extension.

FIG. 5 through FIG. 8 show how tension assembly 28 includes a "U"-shaped bail 46 which includes a center section 47 having a transverse axis which rests on top of cover 22 as illustrated in FIG. 8. Tension bail 46 includes legs 48 and 49 which each have one end connected to to the tension bail center section 47 and the other end attached to the respective lower sections 42 and 43 of extension bail 38 at respective pivots 50 and 51.

Persons versed in the art will appreciate that the configuration of load bed 14 will dictate the placement of the pivots 50 and 51. If load bed 14 is higher than its length between front and rear ends 16 and 17, the pivots 50 and 51 may be closer to the cover 22 than the lower position shown of pivots 50 and 51 in the illustrated embodiment. Pivots 50 and 51 are placed at a suitable height, termed a midpoint on legs 40 and 41 as it is between section 39 and the lower ends of legs 40 and 41, but such a "midpoint" is not necessarily the center of legs 40 and 41.

As shown in FIG. 5 through FIG. 8, as extension bail 38 swings toward the rear end 17 of the truck load bed 14, the flexible cover 22 is pulled out of the winding assembly 24 and extended over load bed 14. As lower sections 42 and 43 of extension bail 38 swing to the rear of the truck, they pull the legs 48 and 49 of tension bail 46 to the rear, which allows center section 47 of tension bail 46 to rest on the flexible cover 22 so as to hold cover 22 securely on load bed 14. When cover 22 is fully extended over load bed 14 as shown in FIG. 1, tension assembly 28 pulls the front of the cover 22 on load bed 14 while extension assembly 26 holds the rear of cover 22 on load bed 14.

As shown in FIG. 9, winding assembly 24 includes an electric motor 52 suitable for being driven off the usual 12 volt battery of truck 10. As shown in FIG. 9, power is supplied through electric line 53 to motor 52, which includes motor winding 54, shaft 55, ball thrust bearing 56, guide bearing 57, and a worm drive 58 on shaft 55. Worm drive 58 drives a worm gear 59 which is rigidly attached to reel 36. Guide bearing 57 may be a roller bearing.

As shown in FIG. 9, the precise amount of cover 22 which is wound on reel 36 is controlled by selectively energizing motor 52. Worm gear 59 prevents winding or unwinding cover 22 on reel 36 except when it is desired to do so.

As shown in FIG. 10, in the illustrated embodiment each of the lower sections 42 and 43 of extension bail 38 is provided with an offset pivot. In FIG. 10 this is shown by means of a pivot tube 60 welded at right angles to lower section 43 of extension bail 38.

The detail of how the extension bail 38 is attached to load bed 14 is illustrated in FIG. 11 in which lower section 43 of extension bail 38 is pivotally attached by a rod 62 which extends through pivot tube 60 and a strap 64 which is secured by two bolts to the side of load bed 14. Strap 64 is made in a "U"-shaped shown in FIG. 12 and partially shown in FIG. 4 so that each end of strap 64 is attached to load bed 14 while allowing lower section of extension bail 38 to pivot on rod 62 between strap 64 and the side of load bed 14.

The bottom end 66 of lower section 43 of extension bail 38 is bent to an angle of approximately 135 degrees toward the front of truck 10 and a tension spring 68 connects end 66 to the front end of strap 64 as shown in FIG. 11 through a threaded adjustment link 70 on which a nut 71 may be adjusted in a conventional manner so as to tighten tension in springs 68 to the desired amount.

As shown in FIG. 11, spring 68 biases bottom end 66 of lower section 43 of extension bail 38 to the front of the truck so as to bias cover support section 39 of extension bail 38 toward the rear of the truck. Extension bail 38 therefore continuously holds cover 22 in tension toward the rear of the truck. Cover 22 selectively uncovers load bed 14 when motor 52 is selectively energized by the operator, causing the winding assembly 24 to wind cover 22 on reel 36 against the tension force of spring 68. Persons versed in the art will appreciate that a similar strap assembly as shown in FIG. 11 made in the form of a mirror image of that shown in FIG. 11 is on the left side of the truck 10.

It is thus apparent as shown in FIG. 3 a substantially reduced downward force is exerted by tension assembly 28 on cover 22 but as the cover 22 is allowed to extend over load bed 14 the tension assembly 28 is pulled toward the cover 22 so it holds down the front of cover 22 against load bed 14 and extension assembly 26 holds the rear of cover 22 against load bed 14.

When cover 22 is fully extended person versed in the art will appreciate the extension of spring 68 is at a minimum but is still adequate to keep cover 22 on load bed 14 to prevent spilling contents of load bed 14.

Persons versed in the art will appreciate that when cover 22 is fully wound on reel 36 the extension of spring 68 is at a maximum. However, the curvature in the bottom end 66 of lower section 43 of extension bail 38 and the offset pivot tube 60 are provided so that much of the tensile force in spring 68 is transmitted through rod 62 and pivot tube 60, which prevents directly passing this bias force assembly 24. Therefore when cover 22 is fully wound on reel 36 most of the tensile force of spring 68 is not directly applied to winding assembly 24, which prevents excessive wear on motor assembly 34.

I claim:

1. A cover assembly for covering a vehicle load bed defined by first and second ends and first and second sides, said cover assembly comprising, in cmbination, a flexible cover; a winding assembly for winding and storing said cover so as to uncover said load bed, said winding assembly including a reel proximate said first load bed end and winding means for winding said cover on said reel; an extension assembly for extending said cover over said load bed, said extension assembly including an extension bail, said extension bail including a cover support section substantially extending across said load bed and first and second legs, said first and second extension bail legs being connected to said cover support section and respectively extending downwardly to said first and second sides of said load bed, extension bail attachment means for attaching each of said extension bail legs to said load bed sides, and bias means for biasing said extension bail cover support section toward said second load bed end so as to extend said cover over said load bed; and a tension bail assembly for pressing downwardly on said cover proximate said first load bed end, said tension bail assembly including a center section substantially extending across said load bed and first and second legs, said first and second tension bail legs having one end connected to said tension bail center section and another end respectively extending downwardly to said first and second sides of said load bed, and actuation means for connecting said tension bail to said extension assembly and applying a downward force through said tension bail center section to said cover so as to selectively apply said downward force on said cover proximate said load bed first end while said cover is extended over said load bed by said extension assembly whereby said load bed is selectively covered by said extension assembly pulling said cover off said reel so as to extend said cover over said load bed toward said second load bed end while said tension bail assembly applies said downward force on said cover over said load bed proximate said first load bed end and said load bed is selectively uncovered by said winding assembly winding said cover onto said reel while said tension bail assembly downward force is substantially reduced on said cover proximate said first load bed end.

2. A cover assembly for covering a vehicle load bed defined by first and second ends and first and second sides, said cover assembly comprising, in combination, a flexible cover; a winding assembly for winding and storing said cover so as to uncover said load bed, said winding assembly including a reel proximate said first load bed end and winding means for winding said cover on said reel; an extension assembly for extending said over said load bed, said extension assembly including an extension bail, said extension bail including a cover support section substantially extending across said load bed and first and second legs, each of said extension bail legs being connected to said cover support section and respectively extending downwardly to said first and second sides of said load bed, extension bail attachment means for attaching each of said extension bail legs to said load bed sides, bias means for biasing said extension bail cover support section toward said second load bed end so as to extend said cover over said load bed, and means for reducing tensile force in said cover when said cover approaches fully wound and fully extended positions; and a tension bail assembly for pressing downwardly on said cover proximate said first load bed end, said tension bail assembly including a center section substantially extending across said load bed and first and second legs, said first and second tension bail legs each having one end connected to said tension bail center section and another end respectively extending downwardly to said first and second sides of said load bed, and actuation means for connecting said tension bail to said extension assembly and applying a downward force through said tension bail center section to said cover so as to selectively apply said downward force on said cover proximate said load bed first end while said cover is extended over said load bed by said extension assembly whereby said load bed is selectively covered by said extension assembly pulling said cover off said reel so as to extend said cover over said load bed toward said second load bed end while said tension bail assembly applies said downward force on said cover over said load bed proximate said first load bed end and said load bed is selectively uncovered by said winding assembly winding said cover onto said reel while said tension bail assembly downward force is substantially reduced on said cover proximate said first load bed end.

3. A cover assembly for covering a vehicle load bed defined by first and second ends and first and second sides, said cover assembly comprising, in combination, a flexible cover; a winding assembly for winding and storing said cover so as to uncover said load bed, said winding assembly including a reel proximate said first load bed end and winding means for winding said cover on said reel; an extension assembly for extending said cover over said load bed, said extension assembly including an extension bail, said extension bail including a cover support section substantially extending across said load bed and first and second legs, each of said extension bail legs being connected to said cover support section and respectively extending downwardly to said first and second sides of said load bed, extension bail attachment means for attaching each of said extension bail legs to said load bed sides, and bias means for biasing said extension bail cover support section toward said second load bed end so as to extend said cover over said load bed; and a tension bail assembly for pressing downwardly on said cover proximate said first load bed end, said tension bail assembly including a center section substantially extending across said load bed and first and second legs, said first and second tension bail legs each having one end connected to said tension bail center section and another end respectively extending downwardly to said first and second sides of said load bed, and actuation means for connecting said tension bail to said extension assembly and applying a downward force through said tension bail center section to said cover, said actuation means including first and second pivot connections respectively between said first and second tension bail legs and a midpoint on said respective first and second extension bail legs so as to selectively apply said downward force on said cover proximate said load bed first end while said cover is extended over said load bed by said extension assembly by lowering said tension bail onto said cover while said cover is being extended over said load bed whereby said load bed is selectively covered by said extension assembly pulling said cover off said reel so as to extend said cover over said load bed toward said second load bed end while said tension bail assembly applies said downward force on said cover over said load bed proximate said first load bed end and said load bed is selectively uncovered by said winding assembly winding said cover onto said reel while said tension bail assembly downward force is substantially reduced on said cover proximate said first load bed end.

4. A cover assembly for covering a vehicle load bed defined by first and second ends and first and second sides, said cover assembly comprising, in combination, a flexible cover; a winding assembly for winding and storing said cover so as to uncover said load bed, said winding assembly including a reel proximate said first load bed end and winding means for winding said cover on said reel; an extension assembly for extending said cover over said load bed, said extension assembly including an extension bail, said extension bail including a cover support section substantially extending across said load bed and first and second legs, each of said extension bail legs being connected to said cover support section and respectively extending downwardly to said first and second sides of said load bed, extension bail attachment means for attaching each of said extension bail legs to said load bed sides, bias means for applying a bias force for biasing said extension bail cover support section toward said second load bed end so as to extend said cover over said load bed, and means for reducing tensile force in said cover when said cover approaches fully wound and fully extended positions, said attachment means including an offset pivot through which a portion of said bias force is transmitted when said cover is wound on said reel so as to reduce tensile force in said cover; and a tension bail assembly for pressing downwardly on said cover proximate said first load bed end, said tension bail assembly including a center section substantially extending across said load bed and first and second legs, said first and second tension bail legs each having one end connected to said tension bail center section and another end respectively extending downwardly to said first and second sides of said load bed, and actuation means for connecting said tension bail to said extension assembly and applying a downward force through said tension bail center section to said cover so as to selectively apply said downward force on said cover proximate said load bed first end while said cover is extended over said load bed by said extension assembly whereby said load bed is selectively covered by said extension assembly pulling said cover off said reel so as to extend said cover over said load bed toward said second load bed end while said tension bail assembly applies said downward force on said cover over said load bed proximate said first load bed end and said load bed is selectively uncovered by said winding assembly winding said cover onto said reel while said tension bail assembly downward force is substantially reduced on said cover proximate said first load bed end.

5. A cover assembly for covering a vehicle load bed defined by first and second ends and first and second sides, said cover assembly comprising, in combination, a flexible cover; a winding assembly for winding and storing said cover so as to uncover said load bed, said winding assembly including a reel proximate said first load bed end and winding means for winding said cover on said reel, said winding means including a motor and a worm drive connecting said motor to said reel; an extension assembly for extending said cover over said load bed, said extension assembly including an extension bail, said extension bail including a cover support section substantially extending across said load bed and first and second legs, each of said extension bail legs being connected to said cover support section and respectively extending downwardly to said first and second sides of said load bed, extension bail attachment means for attaching each of said extension bail legs to said load bed sides, and bias means for biasing said extension bail cover support section toward said second load bed end so as to extend said cover over said load bed; and a tension bail assembly for pressing downwardly on said cover proximate said first load bed end, said tension bail assembly including a center section substantially extending across said load bed and first and second legs, said first and second tension bail legs each having one end connected to said tension bail center section and another end respectively extending downwardly to said first and second sides of said load bed, and actuation means for connecting said tension bail to said extension assembly and applying a downward force through said tension bail center section to said cover, said actuation means including first and second pivot connections respectively between said first and second tension bail legs and a midpoint on said respective first and second extension bail legs so as to selectively apply said downward force on said cover proximate said load bed first end while said cover is extended over said load bed by said extension assembly by lowering said tension bail onto said cover while said cover is being extended over said load bed whereby said load bed is selectively covered by said extension assembly pulling said cover off said reel so as to extend said cover over said load bed toward said second load bed end while said tension bail assembly applies said downward force on said cover over said load bed proximate said first load bed end and said load bed is selectively uncovered by said winding assembly winding said cover onto said reel while said tension bail assembly downward force is substantially reduced on said cover proximate said first load bed end.

6. A cover assembly for covering a vehicle load bed defined by first and second ends and first and second sides, said cover assembly comprising, in combination, a flexible cover; a winding assembly for winding and storing said cover so as to uncover said load bed, said winding assembly including a reel proximate said first load bed end and winding means for winding said cover on said reel; an extension assembly for extending said cover over said load bed, said extension assembly including an extension bail, said extension bail including a cover support section substantially extending across said load bed and first and second legs, each of said extension bail legs being connected to said cover support section and respectively extending downwardly to said first and second sides of said load bed, extension bail attachment means for attaching each of said extension bail legs to said load bed sides, bias means for biasing said extension bail cover support section toward said second load bed end so as to extend said cover over said load bed, and means for reducing tensile force in said cover when said cover approaches fully wound and fully extended positions; and a tension bail assembly for pressing downwardly on said cover proximate said first load bed end, said tension bail assembly including a center section substantially extending across said load bed and first and second legs, said first and second tension bail legs each having one end connected to said tension bail center section and another end respectively extending downwardly to said first and second sides of said load bed, and actuation means for connecting said tension bail to said extension assembly and applying a downward force through said tension bail center section to said cover, said actuation means including first and second pivot connections respectively between said first and second tension bail legs and a midpoint on said respective first and second extension bail legs so as to selectively apply said downward force on said cover proximate said load bed first end while said cover is extended over said load bed by said extension assembly by lowering said tension bail onto said cover while said cover is being extended over said load bed whereby said load bed is selectively covered by said extension assembly pulling said cover off said reel so as to extend said cover over said load bed toward said second load bed end while said tension bail assembly applies said downward force on said cover over said load bed proximate said first load bed end and said load bed is selectively uncovered by said winding assembly winding said cover onto said reel while said tension bail assembly downward force is substantially reduced on said cover proximate said first load bed end.

7. A cover assembly for covering a vehicle load bed defined by first and second ends and first and second sides, said cover assembly comprising, in combination, a flexible cover; a winding assembly for winding and storing said cover so as to uncover said load bed, said winding assembly including a reel proximate said first load bed end and winding means for winding said cover on said reel; an extension assembly for extending said cover over said load bed, said extension assembly including an extension bail, said extension bail including a cover support section substantially extending across said load bed and first and second legs, each of said extension bail legs being connected to said cover support section and respectively extending downwardly to said first and second sides of said load bed, extension bail attachment means for attaching each of said extension bail legs to said load bed sides, bias means for applying a bias force for biasing said extension bail cover support section toward said second load bed end so as to extend said cover over said load bed, and means for reducing tensile force in said cover when said cover approaches fully wound and fully extended positions, said attachment means including an offset pivot through which a portion of said bias force is transmitted when said cover is wound on said reel so as to reduce tensile force in said cover; and a tension bail assembly for pressing downwardly on said cover proximate said first load bed end, said tension bail assembly including a center section substantially extending across said load bed and first and second legs, said first and second tension bail legs each having one end connected to said tension bail center section and another end respectively extending downwardly to said first and second sides of said load bed, and actuation means for connecting said tension bail to said extension assembly and applying a downward force through said tension bail center section to said cover, said actuation means including first and second pivot connections respectively between said first and second tension bail legs and a midpoint on said respective first and second extension bail legs so as to selectively apply a downward force on said cover proximate said load bed first end while said cover is extended over said load bed by said extension assembly by lowering said tension bail onto said cover while said cover is being extended over said load bed whereby said load bed is selectively covered by said extension assembly pulling said cover off said reel so as to extend said cover over said load bed toward said second load bed end while said tension bail assembly applies said downward force on said cover over said load bed proximate said first load bed end and said load bed is selectively uncovered by said winding assembly winding said cover onto said reel while said tension bail assembly downward force is substantially reduced on said cover proximate said first load bed end.

8. A cover assembly for covering a vehicle load bed defined by first and second ends and first and second sides, said cover assembly comprising, in combination, a flexible cover; a winding assembly for winding and storing said cover so as to uncover said load bed, said winding assembly including a reel proximate said first load bed end and winding means for winding said cover on said reel, said winding means including a motor and a worm drive connecting said motor to said reel; an extension assembly for extending said cover over said load bed, said extension assembly including an extension bail, said extension bail including a cover support section substantially extending across said load bed and first and second legs, each of said extension bail legs being connected to said cover support section and respectively extending downwardly to said first and second sides of said load bed, extension bail attachment means for attaching each of said extension bail legs to said load bed sides, bias means for applying a bias force for biasing said extension bail cover support section toward said second load bed end so as to extend said cover over said load bed, and means for reducing tensile force in said cover when said cover approaches fully wound and fully extended positions, said attachment means including an offset pivot through which a portion of said bias force is transmitted when said cover is wound on said reel so as to reduce tensile force in said cover; and a tension bail assembly for pressing downwardly on said cover proximate said first load bed end, said tension bail assembly including a center section substantially extending across said load bed and first and second legs, said first and second tension bail legs each having one end connected to said tension bail center section and another end respectively extending downwardly to said first and second sides of said load bed, and actuation means for connecting said tension bail to said extension assembly and applying a downward force through said tension bail center section to said cover, said actuation means including first and second pivot connections respectively between said first and second tension bail legs and a midpoint of said respective first and second extension bail legs so as to selectively apply said downward force on said cover proximate said load bed first end while said cover is extended over said load bed by said extension assembly by lowering said tension bail onto said cover while said cover is being extended over said load bed whereby said load bed is selectively covered by said extension assembly pulling said cover off said reel so as to extend said cover over said load bed toward said second load bed end while said tension bail assembly applies said downward force on said cover over said load bed proximate said first load bed end and said load bed is selectively uncovered by said winding assembly winding said cover onto said reel while said tension bail assembly downward force is substantially reduced on said cover proximate said first load bed end.

9. A cover assembly for covering a vehicle load bed defined by first and second ends and first and second sides, said cover assembly comprising, in combination, a flexible cover; a winding assembly for winding and storing said cover so as to uncover said load bed, said winding assembly including a reel proximate said first load bed end and winding means for winding said cover on said reel, said winding means including a motor and a worm drive connecting said motor to said reel; an extension assembly for extending said cover over said load bed, said extension assembly including an extension bail, said extension bail including a cover support section substantially extending across said load bed and first and second legs, each of said extension bail legs being connected to said cover support section and respectively extending downwardly to said first and second, sides of said load bed, extension bail attachment means for attaching each of said extension bail legs to said load bed sides, bias means for applying a bias force for biasing said extension bail cover support section toward said second load bed end so as to extend said cover over said load bed, and means for reducing tensile force in said cover when said cover approaches fully wound and fully extended positions, said attachment means including an offset pivot through which a portion of said bias force is transmitted when said cover is wound on said reel so as to reduce tensile force in said cover, said means for reducing tensile force in said cover including at least one tension spring secured at one end to said box and secured at another end to a bottom of said first extension bail leg below said pivot so as to bias said first extension bail leg bottom end toward said vehicle load bed first end so as to apply tension force in said cover through said extension bail; and a tension bail assembly for pressing downwardly on said cover proximate said first load bed end, said tension bail assembly including a center section substantially extending across said load bed and first and second legs, said first and second tension bail legs each having one end connected to said tension bail center section and another end respectively extending downwardly to said first and second sides of said load bed, and actuation means for connecting said tension bail to said extension assembly and applying a downward force through said tension bail center section to said cover, said actuation means including first and second pivot connections respectively between said first and second tension bail legs and a midpoint on said respective first and second extension bail legs so as to selectively apply said downward force on said cover proximate said load bed first end while said cover is extended over said load bed by said extension assembly by lowering said tension bail onto said cover while said cover is being extended over said load bed whereby said load bed is selectively covered by said extension assembly pulling said cover off said reel so as to extend said cover over said load bed toward said second load bed end while said tension bail assembly applies said downward force on said cover over said load bed proximate said first load bed end and said load bed is selectively uncovered by said winding assembly winding said cover onto said reel while said tension bail assembly downward force is substantially reduced on said cover proximate said first load bed end.

10. A cover assembly for covering a vehicle load bed defined by first and second ends and first and second sides, said cover assembly comprising, in combination, a flexible cover; a winding assembly for winding and storing said cover so as to uncover said load bed, said winding assembly including a reel proximate said first load bed end and winding means for winding said cover on said reel, said winding means including a motor and a worm drive connecting said motor to said reel; an extension assembly for extending said cover over said load bed, said extension assembly including an extension bail, said extension bail including a cover support section substantially extending across said load bed and first and second legs, each of said extension bail legs being connected to said cover support section and respectively extending downwardly to said first and second sides of said load bed, extension bail attachment means for attaching each of said extension bail legs to said load bed sides, and bias means for biasing said extension bail cover support section toward said second load bed end so as to extend said cover over said load bed; and a tension bail assembly for pressing downwardly on said cover proximate said first load bed end, said tension bail assembly including a center section substantially extending across said load bed and first and second legs, said first and second tension bail legs each having one end connected to said tension bail center section and another end respectively extending downwardly to said first and second sides of said load bed, and actuation means for connecting said tension bail to said extension assembly and applying a downward force through said tension bail center section to said cover so as to selectively apply said downward force on said cover proximate said load bed first end while said cover is extended over said load bed by said extension assembly whereby said load bed is selectively covered by said extension assembly pulling said cover off said reel so as to extend said cover over said load bed toward said second load bed end while said tension bail assembly applies said downward force on said cover over said load bed proximate said first load bed end and said load bed is selectively uncovered by said winding assembly winding said cover onto said reel while said tension bail assembly downward force is substantially reduced on said cover proximate said first load bed end.

* * * * *